United States Patent
Wang et al.

(10) Patent No.: US 9,323,059 B2
(45) Date of Patent: Apr. 26, 2016

(54) VIRTUAL IMAGE DISPLAY APPARATUS

(71) Applicant: Industrial Technology Research Institute, Hsinchu (TW)

(72) Inventors: Chy-Lin Wang, Taipei (TW); Kuo-Tung Tiao, Hsinchu County (TW); Tian-Yuan Chen, Hsinchu (TW); Lung-Pin Chung, Miaoli County (TW); Chun-Chuan Lin, Hsinchu (TW); Hsien-Chang Lin, Taipei (TW); Chih-Cheng Hsu, Miaoli County (TW); Wei-Jia Huang, Nantou County (TW); Chia-Chen Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 177 days.

(21) Appl. No.: 13/935,583

(22) Filed: Jul. 5, 2013

(65) Prior Publication Data
US 2014/0177063 A1    Jun. 26, 2014

(30) Foreign Application Priority Data
Dec. 21, 2012 (TW) .............................. 101149167 A

(51) Int. Cl.
*G02B 27/01* (2006.01)
*G02B 27/00* (2006.01)
*G02B 5/30* (2006.01)

(52) U.S. Cl.
CPC .............. *G02B 27/0172* (2013.01); *G02B 5/30* (2013.01); *G02B 2027/011* (2013.01); *G02B 2027/0127* (2013.01)

(58) Field of Classification Search
CPC .......... G02B 27/14; G02B 27/10; G02B 5/30; G02B 27/0172; G02B 2027/0127; G02B 2027/011

USPC .............. 359/630, 631, 633, 637; 345/7, 8, 9; 348/115
See application file for complete search history.

(56) References Cited

U.S. PATENT DOCUMENTS

| 5,383,053 A | 1/1995 | Hegg et al. |
| 5,539,578 A * | 7/1996 | Togino ................. G02B 27/017 359/630 |
| 5,546,227 A | 8/1996 | Yasugaki et al. |
| 5,808,801 A * | 9/1998 | Nakayama ......... G02B 27/0172 359/630 |

(Continued)

FOREIGN PATENT DOCUMENTS

TW    200835321    8/2008

OTHER PUBLICATIONS

Cheng et al, "Design of an optical see-through head-mounted display with a low f-Number and large field of view using a freeform prism," Applied Optics 48 (14), May 10, 2009, pp. 2655-2668.

(Continued)

*Primary Examiner* — Bumsuk Won
*Assistant Examiner* — Ephrem Membrahtu
(74) *Attorney, Agent, or Firm* — Jianq Chyun IP Office

(57) ABSTRACT

A virtual image display apparatus configured to be in front of at least one eye of a user includes an image display unit, a first beam splitting unit, and a reflection-refraction unit. The image display unit provides an image beam. The first beam splitting unit disposed on transmission paths of the image beam and an object beam causes at least one portion of the object beam to propagate to the eye and causes at least one portion of the image beam to propagate to the reflection-refraction unit. The reflection-refraction unit includes a lens portion and a reflecting portion on a first curved surface of the lens portion. At least part of the image beam travels through the lens portion, is reflected by the reflecting portion, travels trough the lens portion again, and is propagated to the eye by the first beam splitting unit in sequence.

26 Claims, 11 Drawing Sheets

(56) References Cited

U.S. PATENT DOCUMENTS

| | | | |
|---|---|---|---|
| 6,040,945 A | 3/2000 | Karasawa | |
| 6,064,353 A * | 5/2000 | Hoshi | 345/7 |
| 7,133,207 B2 | 11/2006 | Travers | |
| 7,193,585 B2 | 3/2007 | Takagi | |
| 7,397,607 B2 | 7/2008 | Travers | |
| 8,179,604 B1 | 5/2012 | Prada Gomez et al. | |
| 8,183,997 B1 | 5/2012 | Wong et al. | |
| 2007/0081256 A1* | 4/2007 | Travers | 359/630 |
| 2009/0300535 A1 | 12/2009 | Skourup et al. | |
| 2012/0113223 A1 | 5/2012 | Hilliges et al. | |
| 2014/0071024 A1* | 3/2014 | Fu | 345/8 |

OTHER PUBLICATIONS

Cheng et al., "Design of a wide-angle, lightweight head-mounted display using free-form optics tiling," Optics Letters 36 (11), Jun. 1, 2011, pp. 2098-2100.

Ando et al., "Head Mounted Display using holographic optical element," SPIE 3293, Mar. 18, 1998, pp. 183-189.

Takahashi et al., "Stereoscopic see-through retinal projection head-mounted display," SPIE-IS&T 6803, Jan. 27, 2008, pp. 1-8.

McGuire, "Next-generation head-mounted display," Proc. of SPIE 7618, Jan. 23, 2010, pp. 1-8.

Malik et al., "Visual Touchpad: A Two-handed Gestural Input Device," Proceedings of the 6th international conference on Multimodal interfaces (ICMI '04), Oct. 13-15, 2004, pp. 289-296.

Ukita et al., "Wearable Virtual Tablet: Fingertip Drawing Interface using an Active-Infrared Camera," IAPR Workshop on Machine Vision Applications, Dec. 11-13, 2002, pp. 98-101.

Kato et al., "Marker Tracking and HMD Calibration for a Video-based Augmented Reality Conferencing System," Proceedings of the 2nd IEEE and ACM International Workshop on Augmented Reality' 99, Oct. 20-21, 1999, pp. 85-94.

"Office Action of Taiwan Counterpart Application", issued on Mar. 18, 2015, p. 1-p. 6.

* cited by examiner

VIRTUAL IMAGE DISPLAY APPARATUS

CROSS-REFERENCE TO RELATED APPLICATION

This application claims the priority benefit of Taiwan application serial no. 101149167, filed on Dec. 21, 2012. The entirety of the above-mentioned patent application is hereby incorporated by reference herein and made a part of this specification.

TECHNICAL FIELD

The technical field relates to a virtual image display apparatus.

BACKGROUND

With the advance of display technologies and the progress in state of the art, various display apparatuses comprising delicate handheld displays, high-definition display screens, and three-dimensional (3D) displays achieving visual effects as real as possible have been developed, and images vividly displayed by these display apparatuses reproduce lifelike experiences of excitement beyond imagination. Among the display apparatuses, a head mount display (HMD) characterized by convenience of use and privacy protection has drawn attention to the field of the display technologies. In general, a virtual image produced by the existing HMD is approximately 2 meters to 10 meters away from a human eye, and the field of view is about 22 degrees, such that the existing HMD is not apt to interact with a user in an intuitive manner. In addition, the existing HMD employs optical components with large dimensions in order to eliminate image aberration when images are displayed and observed at a wide viewing angle. Thereby, the large volume and the significant weight of the HMD are very much likely to discomfort the user. Moreover, it is rather difficult to adjust the limited focal lengths and shapes of optical components in the HMD for different users. As a result, how to ensure the compactness as well as the wide display viewing angle of the HMD and simultaneously allow the user to interact with the HMD and enjoy the convenience of use of the HMD has become one of the issues to be resolved promptly in the field of the display technologies.

SUMMARY

One of exemplary embodiments is directed to a virtual image display apparatus configured to be disposed in front of at least one eye of a user. The virtual image display apparatus comprises an image display unit, a first beam splitting unit, and a reflection-refraction unit. The image display unit provides an image beam. The first beam splitting unit is disposed on a transmission path of the image beam and a transmission path of an object beam from a foreign object. The first beam splitting unit causes at least one portion of the object beam to propagate to the eye and causes at least one portion of the image beam to propagate to the reflection-refraction unit. The reflection-refraction unit comprises a lens portion and a reflecting portion, and the lens portion comprises a first curved surface. The reflecting portion is located on the first curved surface of the lens portion. Here, at least one portion of the image beam travels through the lens portion, is reflected by the reflecting portion, travels trough the lens portion again, and is propagated to the eye by the first beam splitting unit in sequence.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
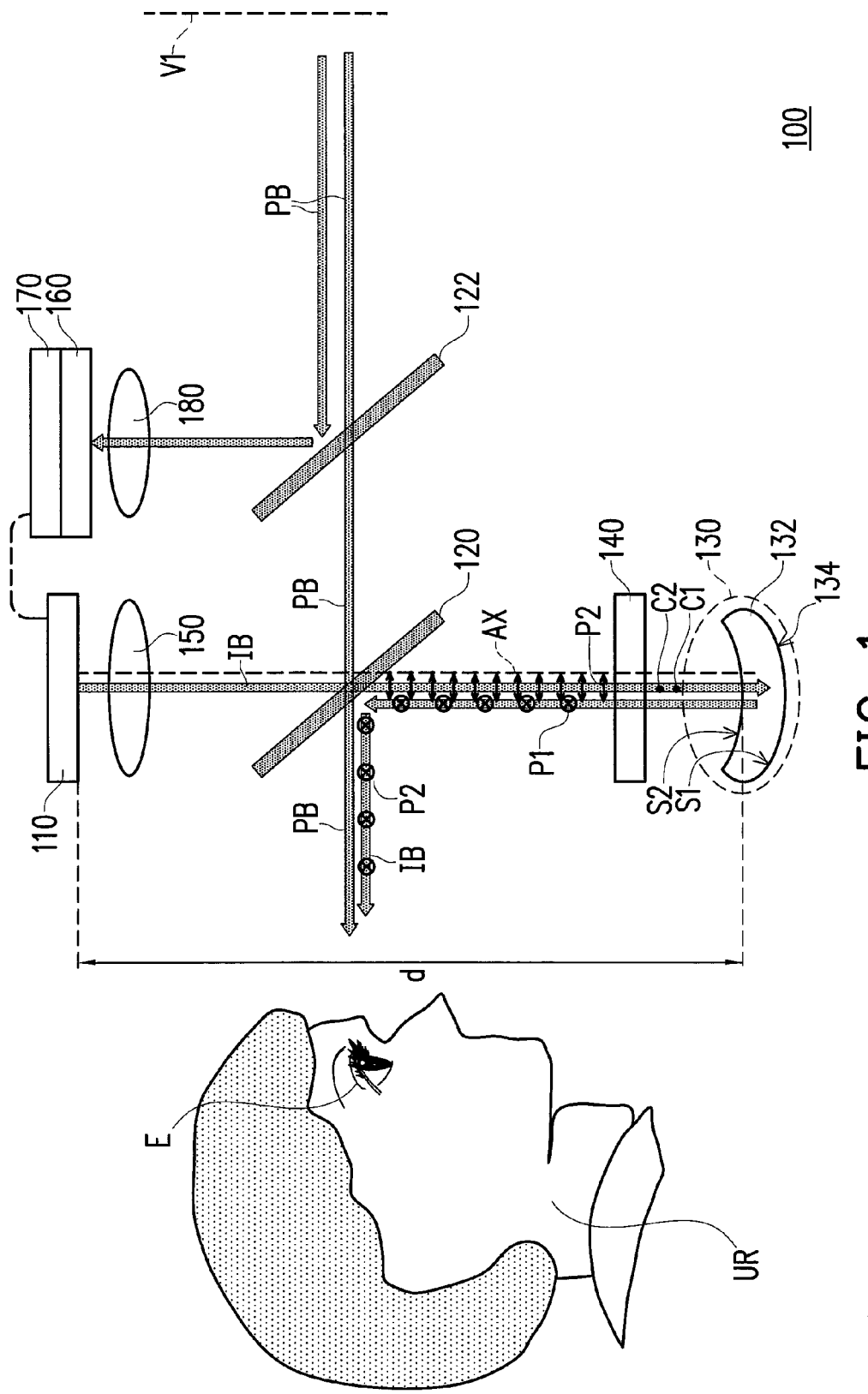
FIG. 1 is a virtual image display apparatus according to an exemplary embodiment.

FIG. 1 is a virtual image display apparatus according to an exemplary embodiment. With reference to FIG. 1, in the present exemplary embodiment, a virtual image display apparatus 100 is located in front of at least one eye E of a user UR. The virtual image display apparatus 100 comprises an image display unit 110, a first beam splitting unit 120, and a reflection-refraction unit 130. The image display unit 110 provides an image beam IB. The first beam splitting unit 120 is disposed on a transmission path of the image beam IB and a transmission path of an object beam PB from a foreign object (e.g., any object surrounding the user UR). The first beam splitting unit 120 causes at least one portion of the object beam PB to propagate to the eye E and causes at least one portion of the image beam IB to propagate to the reflection-refraction unit 130. In the present exemplary embodiment, the first beam splitting unit 120 reflects at least one portion of the object beam PB to the eye E. However, in other embodiments, a portion of the object beam PB may pass through the first beam splitting unit 120 through other optical mechanisms and may then be transmitted to the eye E, which should not be construed as a limitation to the disclosure.

According to the present exemplary embodiment, the reflection-refraction unit 130 comprises a lens portion 132 and a reflecting portion 134. The reflecting portion 134 is located on a first curved surface S1 of the lens portion 132.

Here, at least one portion of the image beam IB travels through the lens portion 132, is reflected by the reflecting portion 134, travels trough the lens portion 132 again, and is propagated to the eye E by the first beam splitting unit 120 in sequence. In the present exemplary embodiment, the reflecting portion 134 may be a reflective film (e.g., a metal coating or a multi-layer coating) on the first curved surface S1 of the lens portion 132, which should however not be construed as a limitation to the disclosure. In this way, both the image beam IB and the object beam PB may be observed by the eye E of the user UR, such that the user UR is able to perceive overlapped images. For instance, the image beam IB may be weather information (e.g., hourly weather forecast) at a place where the user UR is located, and the weather information is displayed by the image display unit 110; the object beam PB may be ambient images of the location of the user UR. Thereby, the user UR is able to observe the actual environmental conditions and obtain the weather information corresponding to the environmental conditions from the image display unit 110 in real time, which facilitates the life of the user UR. The image display unit 110 may also serve to display other information, such as roadway information, roadway navigation information, information of shops around the user UR, shopping information, and so on.

To be specific, as shown in FIG. 1, at least one portion of the image beam IB provided by the image display unit 110 passes through the first beam splitting unit 120 and is propagated to the reflection-refraction unit 130, a portion of the image beam IB reflected by the reflection-refraction unit 130 is reflected to the eye E by the first beam splitting unit 120, and at least one portion of the object beam PB passes through the first beam splitting unit 120 and is propagated to the eye E. However, other combinations of optical paths may also be feasible in other exemplary embodiments, and the disclosure is not limited thereto.

According to the present exemplary embodiment, the virtual image display apparatus 100 may further comprise a wave plate 140 that is located on the transmission path of at least one portion of the image beam IB and between the first beam splitting unit 120 and the reflection-refraction unit 130. Here, the first beam splitting unit 120 may be a polarizing beam splitter. The wave plate 140 described herein may be a quarter wave plate, and the image beam IB has a first linear polarization state P1 after passing through the first beam splitting unit 120. Alternatively, the image beam IB provided by the image display unit 110 may have the first linear polarization state P1, and thus the image beam IB is able to travel through the first beam splitting unit 120. For instance, when the image display unit 110 is a liquid crystal display (LCD) panel, the image display unit 110 is able to emit the image beam IB in a linear polarization state. In other exemplary embodiments, the image display unit 110 may be an organic light-emitting diode (OLED) display, a spatial light modulator (SLM), or any other appropriate display. The image beam IB then sequentially travels to the wave plate 140, the lens portion 132, the reflecting portion 134, and the lens portion 132 and then passes through the wave plate 140, such that the image beam IB then has a second linear polarization state P2. The first linear polarization state P1 and the second linear polarization state P2 are perpendicular to each other, and thus the image beam IB in the second linear polarization state P2 may be reflected by the first beam splitting unit 120 and propagated toward the eye E. For instance, with respect to the first beam splitting unit 120, the first linear polarization state P1 is a p-type polarization state, and the second linear polarization state P2 is an s-type polarization state. However, in other exemplary embodiments, the first beam splitting unit 120 may be a partially-transmissive-partially-reflective beam splitting device, e.g., a neutral density filter or a transflective mirror, and in this case, use of the wave plate 140 may be omitted.

To be specific, the shorter the focal length of the reflection-refraction unit 130, the wider the viewing angle of the virtual image display apparatus 100, and the greater the dimension of the corresponding optical components. However, the issue of aberrations (e.g., distortion, field curvature, and astigmatism) of the off-axis lights may become obvious and may pose a negative impact on the displayed images. Therefore, according to the present exemplary embodiment, the virtual image display apparatus 100 may further comprise a compensation lens 150 that is located on the transmission path of the image beam IB and between the image display unit 110 and the first beam splitting unit 120. When the reflection-refraction unit 130 is designed to have small focal length in response to the requirement for the wide viewing angle, the compensation lens 150 may compensate the resultant aberration and further improve the image quality. For instance, in the present exemplary embodiment as shown in FIG. 1, the lens portion 132 of the reflection-refraction unit 130 is a positive meniscus lens and further has a second curved surface S2 opposite to the first curved surface S1. The first curved surface S1 is a convex surface facing away from the first beam splitting unit 120, and the second curved surface S2 is a concave surface facing the first beam splitting unit 120. Besides, the compensation lens 150 may be a biconvex lens, whereas the disclosure is not limited thereto.

Specifically, according to the present exemplary embodiment, both refractive power of the compensation lens 150 and refractive power of the reflection-refraction unit 130 are positive, and a focal length of the compensation lens 150 is shorter than a focal length of the reflection-refraction unit 130. That is, in the present exemplary embodiment, the lens portion 132 may be a convex lens, and the reflecting portion 134 is a concave minor. Besides, the focal length of the reflection-refraction unit 130 refers to an effective focal length of the whole of the lens portion 132 and the reflecting portion 134. Therefore, according to the present exemplary embodiment, the image display unit 110 may be disposed within the effective focal length formed by the focal length of the reflection-refraction unit 130 and the focal length of the compensation lens 150, so as to present an upright enlarged virtual image to the eye E of the user UR. In addition, when the compensation lens 150 is located between the image display unit 110 and the first beam splitting unit 120, and when the focal length of the compensation lens 150 is shorter than the effective focal length of the reflection-refraction unit 130, said aberration may be effectively corrected, and the image quality may be improved.

Particularly, as shown in FIG. 1, in the present exemplary embodiment, the virtual image display apparatus 100 satisfies a formula d−ΣA<f, wherein d is a distance from the image display unit 110 to the second curved surface S2 of the reflection-refraction unit 130, f is the focal length of the reflection-refraction unit 130, A is a ratio obtained by dividing a difference between an optical path length and an actual length at any position on a light path along an optical axis AX from the image display unit 110 to the reflection-refraction unit 130 by a refraction index at the position, ΣA is a total value of the ratios A at all the positions on the light path along the optical axis AX from the image display unit 110 to the reflection-refraction unit 130, and the ratios A at all the positions are at least partially different from one another. In the present exemplary embodiment, $d-\Sigma A<f$ may be represented by:

$$d - \left( \sum_i ((OPL_i - t_i)/n_i) \right) < f$$

Here, $OPL_i$ refers to the optical path length of a tiny actual length around any position on the light path along the optical axis AX from the image display unit 110 to the reflection-refraction unit 130, wherein the tiny actual length around any position is, for example, a tiny distance from the any position to a next position). The $t_i$ refers to a tiny actual length around any position (e.g., a tiny distance from the any position to the next position) on the light path along the optical axis AX from the image display unit 110 to the reflection-refraction unit 130, and $n_i$ refers to the refraction index at any position on the light path along the optical axis AX from the image display unit 110 to the reflection-refraction unit 130. Therefore, $OPL_i$ may also be represented by $n_i \times t_i$. When the number of the positions on the light path approximates to infinity, and $t_i$ approximates to zero, the operation of the $\Sigma$ operator becomes integral operation. Note that optical components comprising the compensation lens 150, the first beam splitting unit 120, the reflection-refraction unit 130, and the wave plate 140 are all exposed to the air in the present exemplary embodiment (the refraction index of air approaches 1). Therefore, on the light path along the optical axis AX from the image display unit 110 to the reflection-refraction unit 130, the optical path length $OPL_i$ at the positions where the optical components are placed is different from the actual length $t_i$. By contrast, the optical path length $OPL_i$ in the air is substantially the same as the actual length $t_i$, i.e., the difference between the optical path length $OPL_i$ and the actual length $t_i$ is zero. In addition, according to the present exemplary embodiment, the reflection index of each optical component is assumed to have a constant value (i.e., each optical component is assumed to be made of a uniform material), and thereby the above-mentioned formula may be reduced to:

$$d - \left( \sum_{j=0}^{k} ((n_j - 1) * t_j)/n_j \right) < f$$

Here, $n_j$ refers to the refraction index of any optical component (e.g., the compensation lens 150, the first beam splitting unit 120, the reflection-refraction unit 130, and the wave plate 140 shown in FIG. 1), k represents the number of optical components on the light path along the optical axis AX from the image display unit 110 to the reflection-refraction unit 130, and k is equal to 4 in the present exemplary embodiment. Besides, $t_j$ refers to the thickness of any optical component (e.g., the compensation lens 150, the first beam splitting unit 120, the reflection-refraction unit 130, and the wave plate 140 shown in FIG. 1) along the optical axis AX. For instance, in the present exemplary embodiment, $n_1$ is the refraction index of the compensation lens 150, $n_2$ is the refraction index of the first beam splitting unit 120, $t_1$ is the thickness of the compensation lens 150 along the optical axis AX, $t_2$ is the thickness of the first beam splitting unit 120 along the optical axis AX, and so forth. Note that the number of the optical components is merely exemplified herein to describe the present exemplary embodiment; in other exemplary embodiments, the number of the optical components and the refraction indices of the optical components may be different from those described in the present exemplary embodiment, and these optical components may be placed in a material whose refraction index is not equal to 1. The disclosure is not limited thereto.

Moreover, in the present exemplary embodiment, the eye E may observe a first virtual image V1 corresponding to the image display unit 110 through the first beam splitting unit 120, and the first beam splitting unit 120 is located between the first virtual image V1 and the eye E. In order for the user UR to interact with the virtual image display apparatus 100 and provide more information, a location of the first virtual image V1 may be at a position where a hand of the user UR or a handheld object held by the user UR is able to touch. For instance, in the present exemplary embodiment, for the purpose of observation and interaction, the size of the first virtual image V1 may be greater than 10 inches. When the first virtual image V1 is located 20 cm in front of the eye E, the virtual image display apparatus 100 satisfies $1.31*(d-\Sigma A)>f$. Based on the descriptions provided above, the aforesaid formula may be further reduced to the following:

$$1.31 * \left\{ d - \left( \sum_{j=0}^{k} ((n_j - 1) * t_j)/n_j \right) \right\} > f$$

Alternatively, when the first virtual image V1 is located more distantly in front of the eye E, for instance, located 100 cm in front of the eye E, the virtual image display apparatus 100 satisfies $1.2275*(d-\Sigma A)<f$, and the aforesaid formula may be reduced to the following according to the descriptions provided above:

$$1.2275 * \left\{ d - \left( \sum_{j=0}^{k} ((n_j - 1) * t_j)/n_j \right) \right\} < f$$

That is, the location of the first virtual image V1 observed by the eye E may be changed by modifying the distance d from the image display unit 110 to the reflection-refraction unit 130. To satisfy the need of a nearsighted user or a farsighted user, the virtual image display apparatus 100 may be further equipped with an adjustment mechanism for modifying the distance d from the image display unit 110 to the reflection-refraction unit 130 in compliance with different refraction powers of eyes of different users. Thereby, it is not necessary for the nearsighted user or the farsighted user to wear corrective eyeglasses, and the nearsighted user or the farsighted user can still clearly observe the image displayed by the virtual image display apparatus 100. Alternatively, the user may, based on his or her needs, adjust the distance d from the image display unit 110 to the reflection-refraction unit 130, so as to correspondingly change the location of the first virtual image V1. This is conducive to the interaction between the virtual image display apparatus 100 and a finger or any other handheld object.

According to the present exemplary embodiment, in order for the eye E to observe clearer images, an Abbe number of the reflection-refraction unit 130 is smaller than 40, and an Abbe number of the compensation lens 150 is greater than 40. Thereby, color aberration of the optical components with respect to the image beam IB may be reduced, and the image quality may be further improved. In addition, to allow the user UR to observe images and operate the virtual image display apparatus 100 in an easy manner, a field of view (FOV) of the virtual image display apparatus 100 may be greater than 29 degrees, and the image aberration caused by the enlarged reflection-refraction unit 130 for widening viewing angle may be compensated by the compensation lens 150. This may be referred to as the above descriptions related to the compensation lens 150 and thus will not be further explained hereinafter. The virtual image display apparatus 100 may provide one two-dimensional image to the eyes E by means of one single image display unit 110 that covers the binocular vision field or provide two two-dimensional image respectively to the two eyes E of the user UR by means of two image display units 110 respectively corresponding to two eyes of the user UR. The two image display units 110 respectively corresponding to two eyes of the user UR may also be applied to create a three-dimensional image. The disclosure is not limited thereto.

Figure 2A:
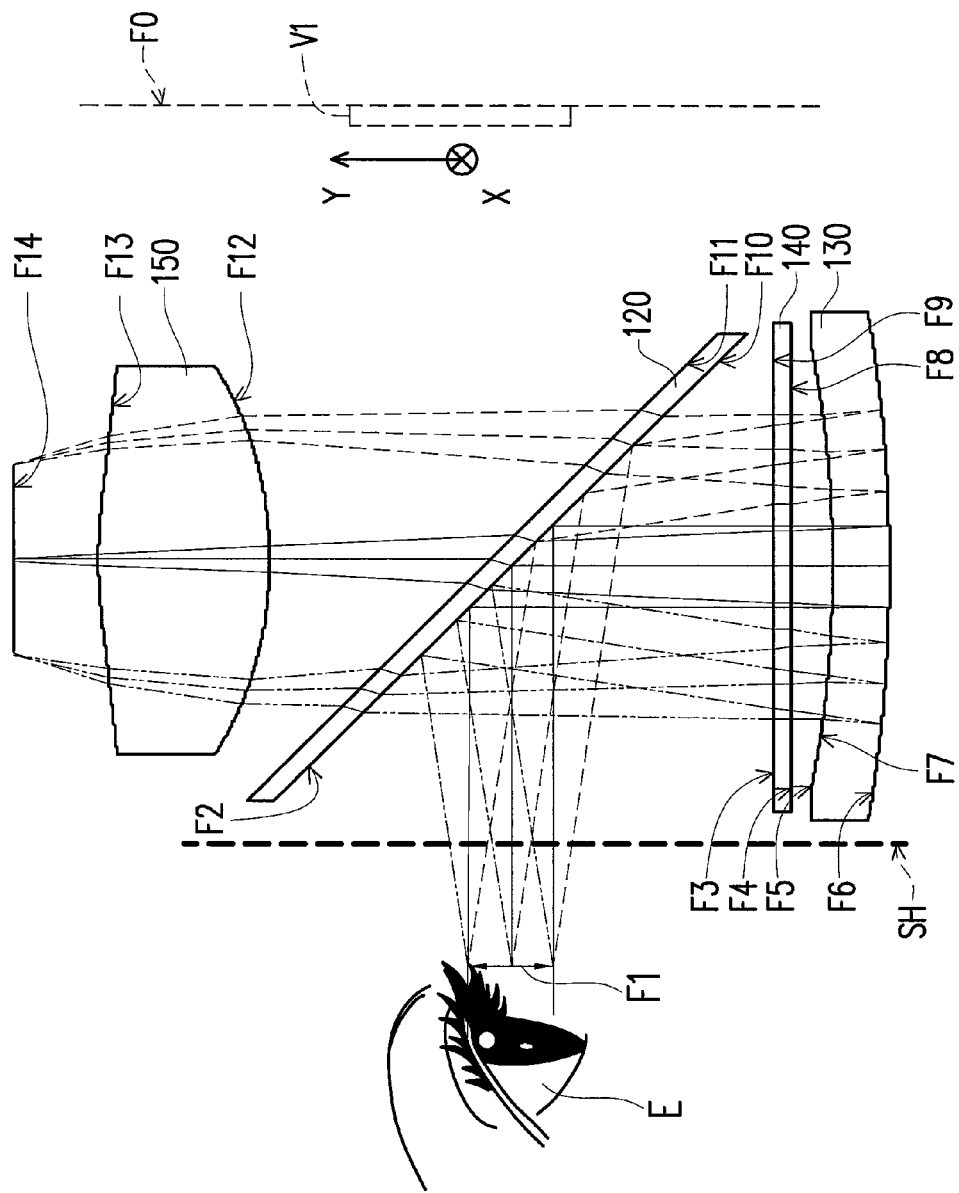
FIG. 2A is a schematic partial view illustrating the virtual image display apparatus according to the exemplary embodiment depicted in FIG. 1.
Figure 2B:
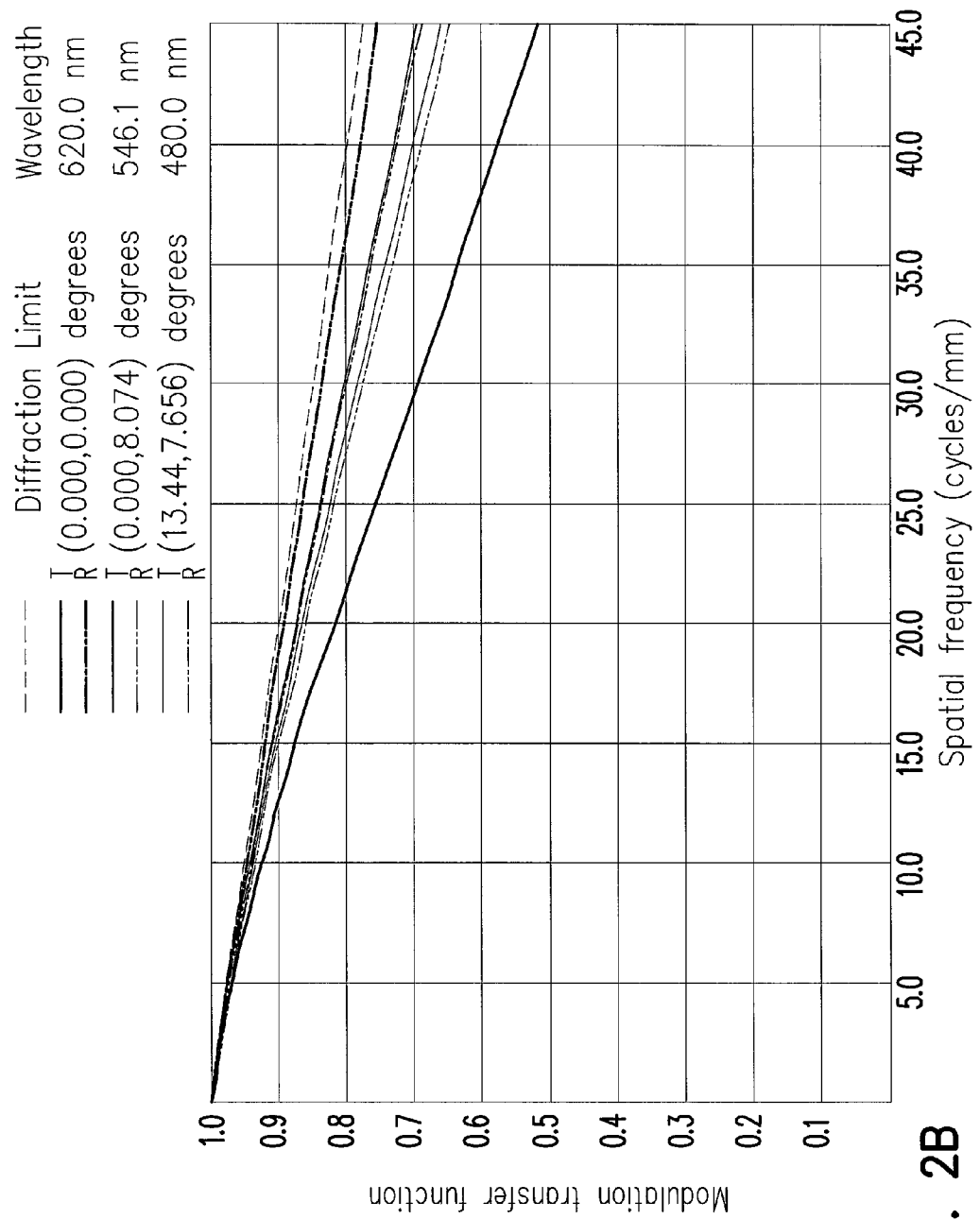
FIG. 2B is a modulation transfer function (MTF) chart illustrating the virtual image display apparatus depicted in FIG. 2A.
Figure 2C:
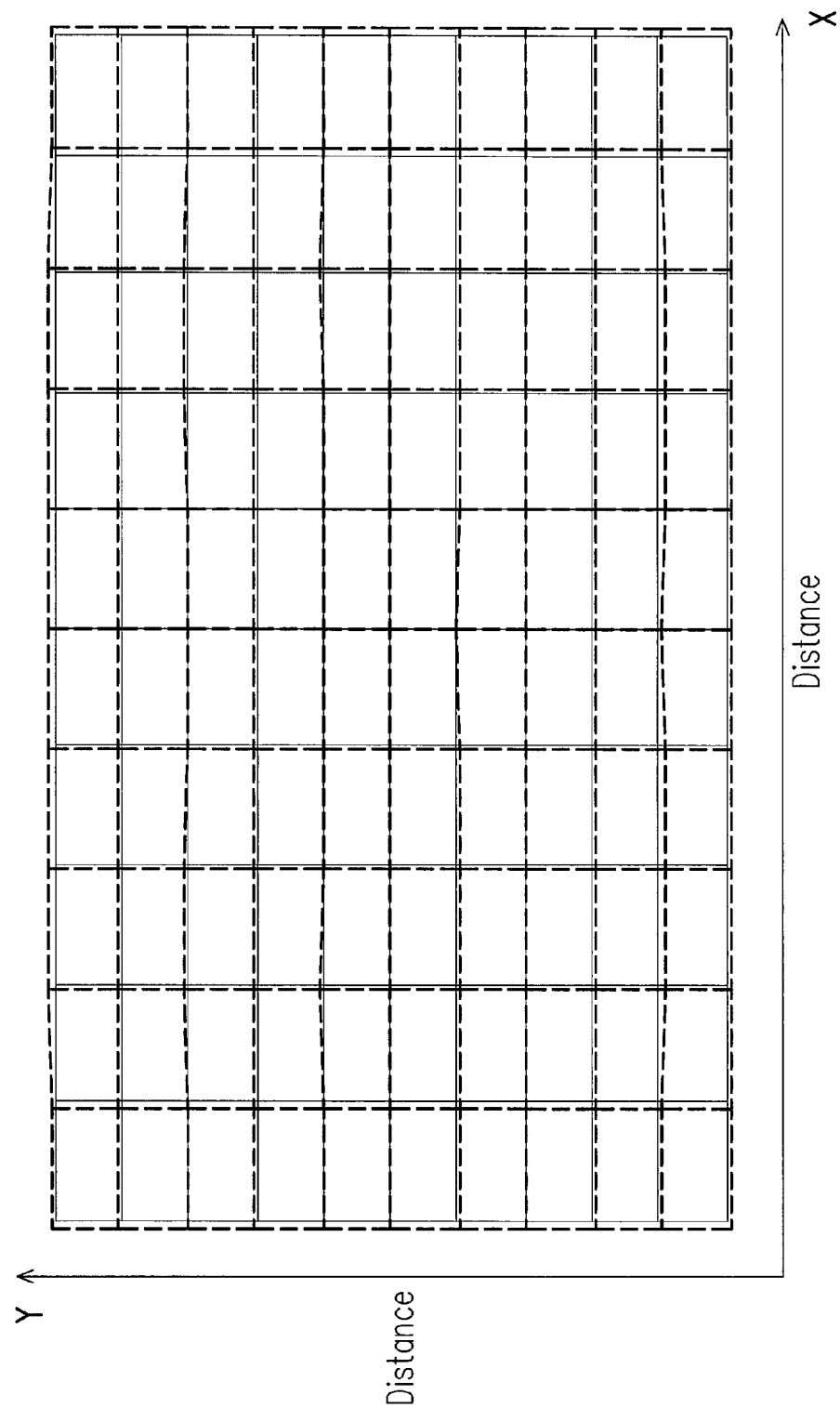
FIG. 2C is a comparison chart illustrating a difference between a grid line and a first virtual image observed by a human eye through the virtual image display apparatus depicted in FIG. 2A.

FIG. 2A is a schematic partial view illustrating the virtual image display apparatus according to the exemplary embodiment depicted in FIG. 1. FIG. 2B is a modulation transfer function (MTF) diagram illustrating the virtual image display apparatus depicted in FIG. 2A. FIG. 2C is a comparison chart (i.e., a distortion diagram) illustrating a difference between a grid line and a first virtual image observed by a human eye through the virtual image display apparatus depicted in FIG. 2A. With reference to FIG. 1 and FIG. 2A to FIG. 2C, in the present exemplary embodiment, the image display unit 110, the compensation lens 150, the first beam splitting unit 120, the reflection-refraction unit 130, and the wave plate 140 may be collectively designed, so as to determine the imaging properties of the first virtual image V1. The detailed optical parameters are provided in Table 1A:

TABLE 1A

| Surface | Type of Surface | Radius of Curvature | Interval | Material | Notes |
|---|---|---|---|---|---|
| F0 | Plane | Infinity | −480 | | Eye E |
| F1 | Plane | Infinity | 14.2 | | Aperture stop |
| F2 | Plane | Infinity | −9.25 | | Reflecting surface of first beam splitting unit |
| F3 | Plane | Infinity | −0.55 | BK7 | Wave Plate |
| F4 | Plane | Infinity | −1.5 | | |
| F5 | Aspheric surface | 44.62296 | −2 | 'OKP4HT' | Reflection-refraction unit |
| F6 | Aspheric surface | 56.71765 | 2 | 'OKP4HT' | Reflection-refraction unit |
| F7 | Aspheric surface | 44.62296 | 1.5 | | Reflection-refraction unit |
| F8 | Plane | Infinity | 0.55 | BK7 | Wave Plate |
| F9 | Plane | Infinity | 9.25 | | |
| F10 | Plane | Infinity | 0.99 | BK7 | First beam splitting unit |
| F11 | Plane | Infinity | 7.5 | | |
| F12 | Aspheric surface | 15.33131 | 6 | 'Z-E48R' | Compensation lens |
| F13 | Aspheric surface | −14.23359 | 3 | | |
| F14 | Plane | Infinity | 0 | | Image display unit |

Here, the radius of curvature shown in Table 1A is in unit of mm, and "OKP4HT" in the column of "Material" represents polyester. The refraction index of "OKP4HT" is about 1.633, and the Abbe number of "OKP4HT" is about 23.3. BK7 represents one type of optical glass, the refraction index of BK7 is about 1.517, and the Abbe number of BK7 is about 64.2. Z-E48R represents another type of optical glass, the refraction index of Z-E48R is about 1.53, and the Abbe number of Z-E48R is about 55. The numbers shown in the column of "Material" is well-known and used in the pertinent field. In addition, the surfaces F1 to F14 provided in Table 1A respectively represent the surfaces which the beam (emitted from the eye E to the image display unit 110) sequentially travels to, as shown in FIG. 2A. Here, the surface F0 represents the location of the first virtual image V1, and the surface F14 represents the display surface of the image display unit 110. The surface F1 represents the exit pupil of the virtual image display apparatus 100. In the present exemplary embodiment, the diameter of the exit pupil of the virtual image display apparatus 100 is 8 mm; thereby, the pupil of the eye E may move within the range of the 8-mm diameter of the exit pupil without negatively affecting the display quality of the virtual image. Namely, when the user UR wears the virtual image display apparatus 100, the pupil of the eye E may move within a certain range and the eye E can still observe the virtual image with favorable quality. As a result, the eye E may naturally observe the contents of the virtual image without suffering from fatigue. The surface F2 represents an interface where light is reflected by the first beam splitting unit 120. The surfaces F3 and F4 represent two surfaces of the wave plate 140. The surfaces F5 and F6 respectively represent the second curved surface S2 and the first curved surface S1 of the reflection-refraction unit 130. After light is reflected by the reflecting portion 134 on the first curved surface S1, the light again passes through an inner surface (i.e., the surface F6) on the reflection-refraction unit 130, again passes through the surfaces F8 and F9 of the wave plate 140 and is transmitted to the first beam splitting unit 120 (i.e., the surface F10), again passes through the surface F11 of the first beam splitting unit 120 and is transmitted to the surfaces F12 and F13 of the compensation lens 150, and is then transmitted to the display surface of the image display unit 110. Here, the column of "Interval" indicates the distance from one of the surfaces to the next surface. In the present exemplary embodiment, the surface F0 represents the location of the first virtual image V1, and the interval has a negative value. After the light travels through the reflecting surface, the interval has a negative value; after the light travels through the reflecting surface again, the interval has a positive value. Other changes to the interval may follow said principle. However, the disclosure is not limited thereto, and said descriptions and Table 1A merely serve to explain the present exemplary embodiment. In this case, the size of the pupil of the eye E is set to be 3 mm. With reference to FIG. 2B and FIG. 2C, it may be observed from FIG. 2B that the MTF of the virtual image display apparatus 100 is greater than 0.8 when the spatial frequency is 20 cycles per millimeter; even though the spatial frequency reaches 45 cycles per millimeter, the MTF of the virtual image display apparatus 100 is greater than 0.5. That is, the design of the virtual image display apparatus 100 ensures the favorable contrast and clarity of the first virtual image V1, and the issue of aberration does not affect the first virtual image V1 to a great extent. As shown in FIG. 2C, in the present exemplary embodiment, the imaging distortion of the first virtual image V1 on the x-y plane on the surface F0 is subtle, e.g., less than 2%. The percentage herein refers to the ratio calculated by comparing the first virtual image V1 with a standard grid line. To be specific, in the present exemplary embodiment, the size of the first virtual image V1 is designed to be 10 inches, the focal length of the reflection-refraction unit 130 is 32.58 mm, and the focal length of the compensation lens 150 is 14.88 mm. The distance from the first virtual image V1 to the eye E is about 48 cm, and the distance from the image display unit 110 to the reflection-refraction unit 130 is 28.79 mm. In this case, (d−ΣA)/f=1.24, and the FOV of the first virtual image V1 is 29.62 degrees. Thereby, the virtual image display apparatus 100 with small volume and the less number of lenses may provide the first virtual image V1 with favorable image quality. In addition, the aspheric parameters of said aspheric surface are shown in the following Table 1B:

TABLE 1B

|  | F5 | F6 | F7 | F12 | F13 |
|---|---|---|---|---|---|
| Radius of Lens | 44.622964 | 56.717647 | 44.622964 | 15.331307 | −14.23359 |
| Conic Constant (K) | −4.133855 | 11.223448 | −4.133855 | −10.55194 | −0.456151 |
| Fourth-order Parameter ($A_4$) | 3.56E−05 | 2.15E−06 | 3.56E−05 | 0.0005343 | 0.0013482 |
| Sixth-order Parameter ($A_6$) | −2.17E−07 | −9.16E−08 | −2.17E−07 | −5.57E−06 | −3.69E−05 |
| Eighth-order Parameter ($A_8$) | 0 | 0 | 0 | 1.95E−08 | 5.04E−07 |
| Tenth-order Parameter ($A_{10}$) | 0 | 0 | 0 | 2.44E−10 | −2.42E−09 |

The aspheric function is as follows:

$$Z(Y) = \frac{CY^2}{1 + (1-(1+K)(C)^2 Y^2)^{1/2}} + (A_4)Y^4 + (A_6)Y^6 + (A_8)Y^8 + (A_{10})Y^{10}$$

Here, Z(Y) is a sag of the displacement of the surface from the vertex or the related perpendicular line in the direction of the optical axis AX, C is the reciprocal of the radius of the osculating sphere, that is, the reciprocal of the radius of curvature near the optical axis AX (e.g., the radii of curvatures for surfaces F5, F6, F7, F12, and F13 listed in Table 1A). k is the conic coefficient, Y is the height of the aspheric surface, where the height is defined as the distance from the center of the lens to the edge of the lens, and $A_4$, $A_6$, $A_8$, and $A_{10}$ are aspheric coefficients. Thereby, the virtual image display apparatus 100 with the small volume may have favorable imaging quality.

To be specific, in the present exemplary embodiment, the eye box of the virtual image display apparatus 100 refers to an 8-mm-diameter circular range. In addition, the eye relief range is 5.7 mm; namely, within the cylindrical range defined by the eye box and the eye relief, the image disparity of the observed first virtual image V1 is insignificant, such that the use of the virtual image display apparatus 100 is flexible.

As shown in FIG. 1, in the present exemplary embodiment, the virtual image display apparatus 100 may further comprise an image sensing module 160 and a control unit 170. The image sensing module 160 detects a relationship between a location of the first virtual image V1 and a location of a finger or a handheld object, and the control unit 170 controls the first virtual image V1 displayed by the image display unit 110 according to the relationship, so as to interact with the user UR. In the present exemplary embodiment, the image sensing module 160 is an image depth sensor, and the control unit 170 is a microcontroller, for instance. For example, if the user UR wearing the virtual image display apparatus 100 intends to take a bus, the virtual image display apparatus 100 is able to provide bus time schedule (i.e., the first virtual image V1) for the reference of the user UR according to the bus station where the user UR is located. When the user UR points on the bus time schedule with his or her finger, the image sensing module 160 detects the motion and the moving direction of the finger tip and feeds back the detected information, such that the image display unit 110 is controlled to generate an image corresponding the motion of the finger tip of the user UR. Here, the generated image indicates that the user UR flips pages of the bus time schedule or closes the bus time schedule window, for example, and thereby the user UR may interact with the virtual image display apparatus 100 and obtain desired information. Accordingly, the life of the user UR becomes more convenient. What is more, the image sensing module 160 may, according to the location of the finger tip of the user UR, control the image display unit 110 to selectively cancel the image corresponding to the location of the finger tip. As such, the user UR may feel that his or her finger moves on the bus time schedule (i.e., the first virtual image V1), which gives the sense of reality and enhances the intuitional use of the virtual image display apparatus 100.

The virtual image display apparatus 100 may further comprise a second beam splitting unit 122, and the first beam splitting unit 120 is located between the eye E and the second beam splitting unit 122. As shown in FIG. 1, after the object beam PB and the image beam IB pass through the first beam splitting unit 120, the transmission path of the object beam PB coincides with the transmission path of the image beam IB. Besides, the first beam splitting unit 120 is substantially parallel to the second beam splitting unit 122, which should however not be construed as a limitation to the disclosure. According to the present exemplary embodiment, the second beam splitting unit 122 and the first beam splitting unit 120 may be the same optical components or different optical components, which is not limited in the disclosure. For instance, the first beam splitting unit 120 and the second beam splitting unit 122 may both be polarizing beam splitters or partially-transmissive-partially-reflective beam splitting devices. Alternatively, the first beam splitting unit 120 may be the polarizing beam splitter, and the second beam splitting unit 122 may be the partially-transmissive-partially-reflective beam splitting device, or vice versa. Other details will not be further provided hereinafter. In addition, the virtual image display apparatus 100 may further has an imaging lens 180 that is located between the second beam splitting unit 122 and the image sensing module 160, such that the object beam PB is well imaged on the image sensing module 160. The optical properties of the imaging lens 180 may be designed in consideration of the image sensing module 160 and will not be further explained hereinafter.

Additionally, in the present exemplary embodiment, the second beam splitting unit 122 reflects one portion of the object beam PB to the image sensing module 160, and the other portion of the object beam PB passes through the second beam splitting unit 122 and is propagated towards the first beam splitting unit 120, so as to propagate to the eye E. However, the disclosure is not limited thereto; in other exemplary embodiments, other designs of light paths may also be feasible (e.g., the second beam splitting unit 122 may reflect one portion of the object beam PB to the eye E), and the effects achieved thereby may be similar to those accomplished in the present exemplary embodiment. Particularly, as shown in FIG. 1, the image sensing module 160 described in the present exemplary embodiment may be located beside the image display unit 110, one portion of the object beam PB is reflected by the second beam splitting unit 122 and is propagated toward the image sensing module 160, another portion of the object beam PB passes through the first beam splitting unit 120 and is then propagated to the eye E, and the transmission path of the object beam PB and the transmission path of the image beam IB are the same and share a same optical axis.

In the present exemplary embodiment, the FOV of the object beam PB observed by the eye E is greater than the FOV of the image beam IB, and a distance of the object beam PB traveling from a foreign object (e.g., an object surrounding the user UR) to the eye E is greater than or substantially equal to a distance from the first virtual image V1 observed by the eye E to the eye E. That is, when the user UR wears the virtual image display apparatus 100, the eye E is able to observe ambient images (i.e., images of surrounding objects) at a relatively wide viewing angle; if necessary, the user UR is able to obtain the contents of the first virtual image V1 visually close to the user UR through the virtual image display apparatus 100 at a relatively narrow viewing angle. Thereby, the user UR may interact with the virtual image display apparatus 100 to obtain other information and can still perceive the distance to the surroundings. Meanwhile, visual confusion is prevented, so as to ensure that the user UR may use the virtual image display apparatus 100 in a safe manner.

Figure 3A:
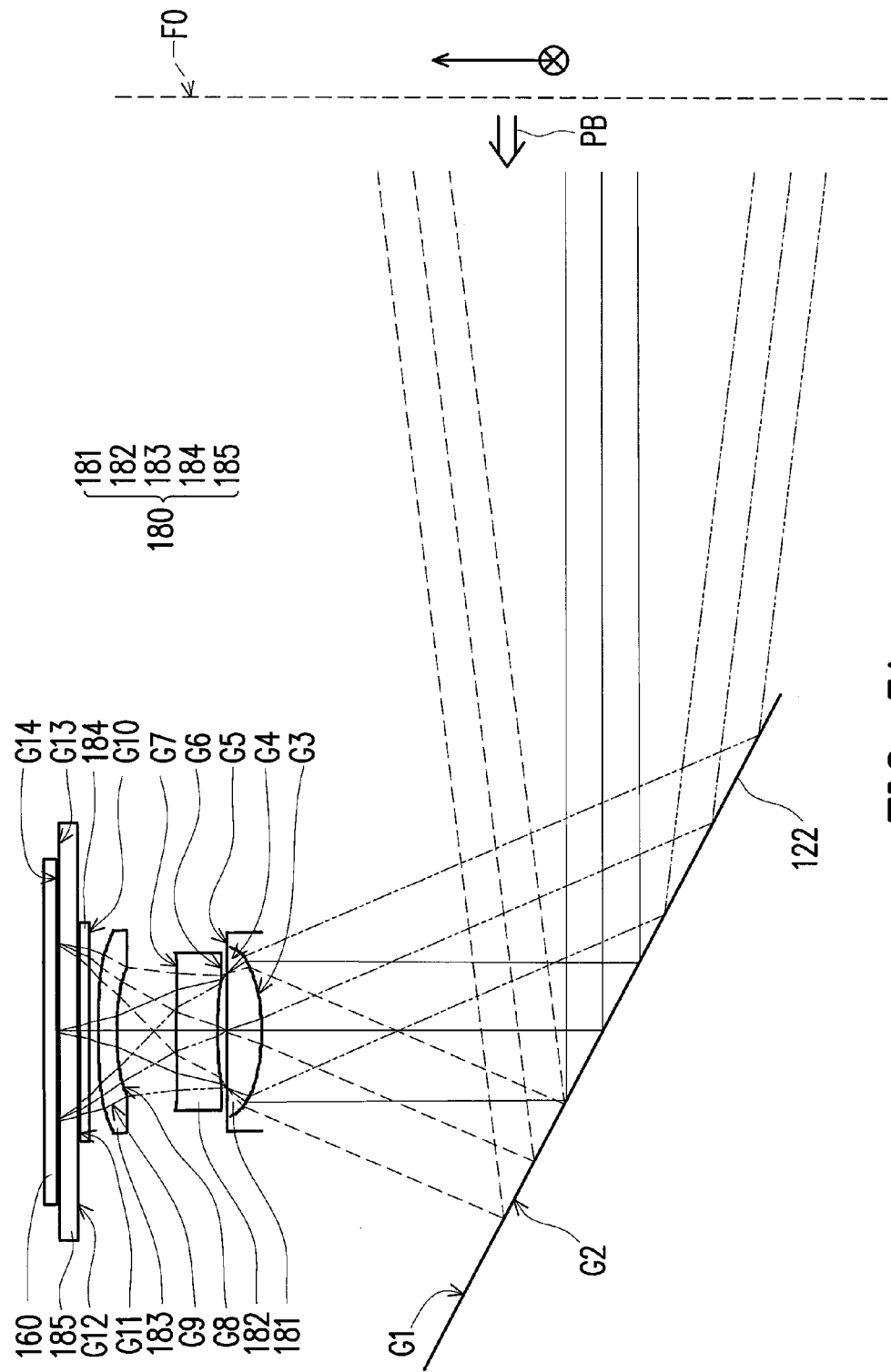
FIG. 3A is a schematic partial view illustrating the virtual image display apparatus according to the exemplary embodiment depicted in FIG. 1.
Figure 3B:
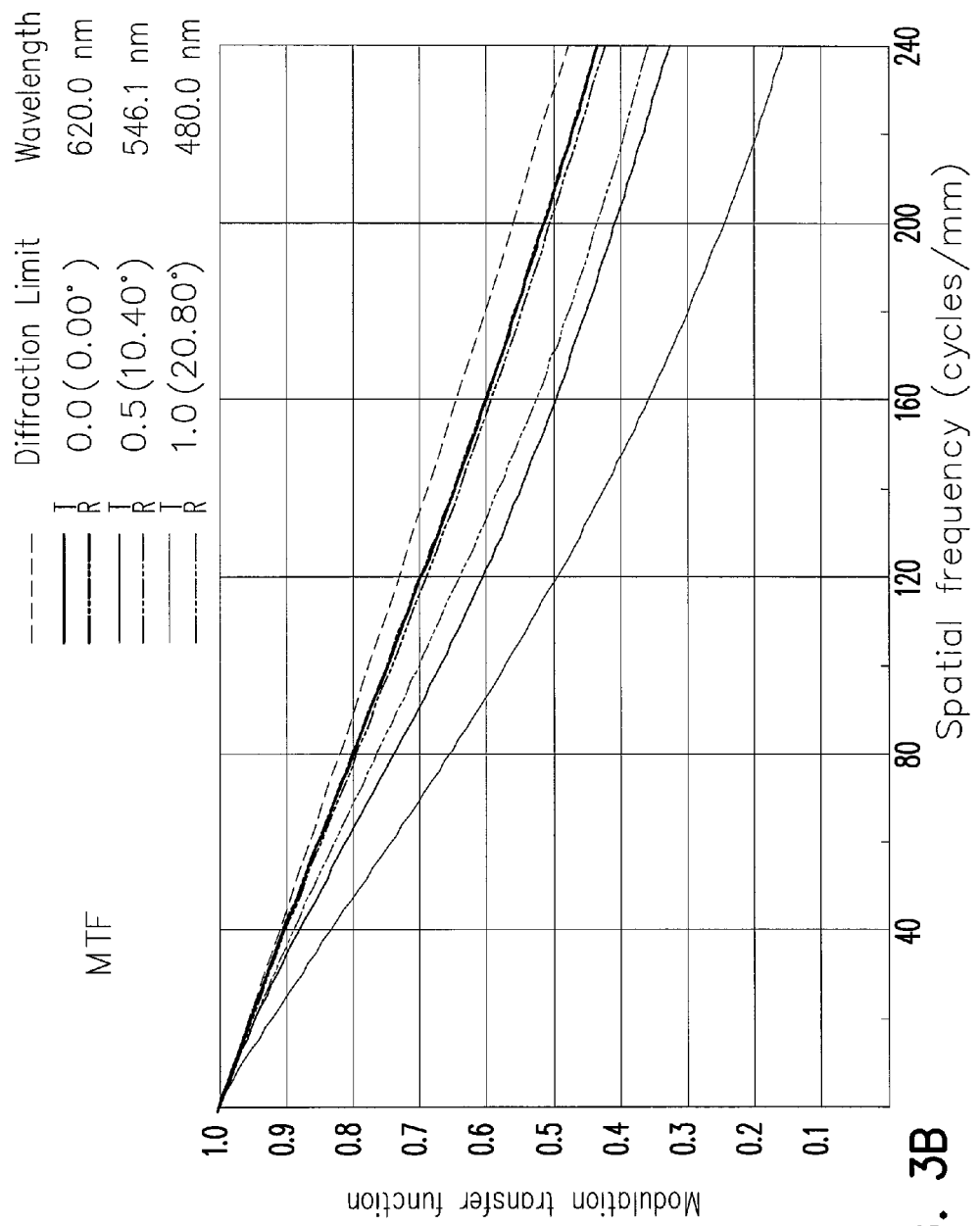
FIG. 3B is an MTF diagram illustrating the virtual image display apparatus depicted in FIG. 3A.
Figure 3C:
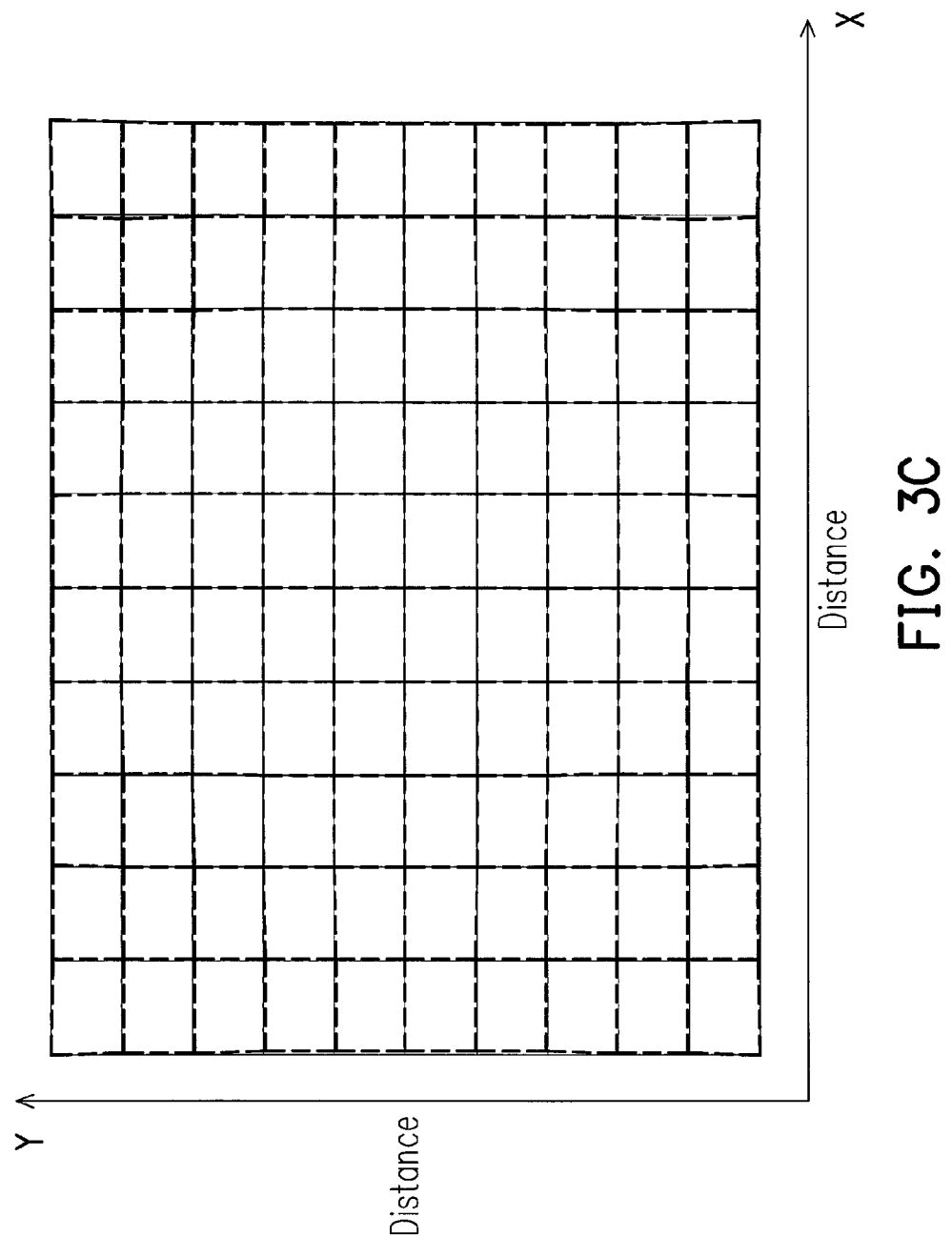
FIG. 3C is a comparison chart illustrating a difference between a grid line and an object beam observed by a human eye through the virtual image display apparatus depicted in FIG. 3A

FIG. 3A is a schematic partial view illustrating the virtual image display apparatus according to the exemplary embodiment depicted in FIG. 1. FIG. 3B is an MTF diagram illustrating the virtual image display apparatus depicted in FIG. 3A. FIG. 3C is a comparison chart illustrating a difference between a grid line and an object beam observed by a human eye through the virtual image display apparatus depicted in FIG. 3A. With reference to FIG. 1 and FIG. 3A to FIG. 3C, in the present exemplary embodiment, the image sensing module 160 and the second beam splitting unit 122 may be collectively designed, so as to determine the imaging properties of the object beam PB. The detailed optical parameters are provided in Table 2A:

Here, the radius of curvature shown in Table 2A is in unit of mm, and "OKP4HT'" in the column of "Material" represents polyester. The refraction index of "OKP4HT'" is about 1.633, and the Abbe number of "OKP4HT'" is about 23.3. BK7_SCHOTT represents one type of optical glass, the refraction index of BK7_SCHOTT is about 1.517, and the Abbe number of BK7_SCHOTT is about 64.2. Z-E48R represents another type of optical glass, the refraction index of Z-E48R is about 1.53, and the Abbe number of Z-E48R is about 55.8. The surfaces G1 to G14 shown in Table 1 are respectively depicted in FIG. 3A. Here, the surface F0 represents the initial position where the object beam PB starts to be transmitted, and the surface G14 represents the image sensing module 160. The surfaces G1 and G2 represent the reflecting surfaces of the second beam splitting unit 122, and the surface G5 represents the aperture stop of the imaging lens 180. In the present exemplary embodiment, the imaging lens 180 may, for instance, comprise the first lens 181 having the surfaces G3 and G4, the second lens 182 having the surfaces G6 and G7, the third lens 183 having the surfaces G8 and G9, the fourth lens 184 having the surfaces G10 and G11, and the fifth lens 185 having the surfaces G12 and G13. The object beam PB may be transmitted to the surface G14 of the image sensing module 160 after sequentially traveling through said surfaces. In this case, the size of the pupil of the eye E is set to be 3 mm. Note that the surfaces G3 to G14 (i.e., the surfaces of the lenses in the imaging lens 180 shown in FIG. 3A) are merely exemplified to explain the present exemplary embodiment and may differ in other exemplary embodiments according to actual design of the image sensing module 160. The disclosure is not limited thereto. Particularly, in the present exemplary embodiment, the imaging focal length of the imaging lens 180 is 4.5 mm, the total track of the imaging lens 180 is 4.5 mm, and the FOV of the object beam PB is 41.6 degrees (greater than 29.62 degrees, i.e. the FOV of the first virtual image V1), for instance.

In addition, the aspheric parameters of said aspheric surface are shown in the following Table 2B:

TABLE 2A

| Surface | Type of Surface | Radius of Curvature | Interval | Material | Notes |
|---|---|---|---|---|---|
| F0 | Plane | Infinity | 450.0000 | | Initial position where the object beam starts to be transmitted |
| G1 | Plane | Infinity | 0.0000 | | Second beam splitting unit |
| G2 | Plane | Infinity | −7.5000 | | |
| G3 | Aspheric surface | −8.20E−01 | −0.7587 | 'Z-E48R' | First lens |
| G4 | Aspheric surface | −2.08E−02 | −0.0191 | | |
| G5 | Plane | Infinity | −0.2050 | | Aperture stop |
| G6 | Aspheric surface | 0.5013811 | −0.9024 | 'OKP4HT' | Second lens |
| G7 | Aspheric surface | 0.2029698 | −1.3097 | | |
| G8 | Aspheric surface | 6.74E−01 | −0.4000 | 'Z-E48R' | Third lens |
| G9 | Aspheric surface | 1.55E−01 | −0.2000 | | |
| G10 | Plane | Infinity | −0.2100 | BK7_SCHOTT | Fourth lens |
| G11 | Plane | Infinity | −0.0500 | | |
| G12 | Plane | Infinity | −0.4000 | BK7_SCHOTT | Fifth lens |
| G13 | Plane | Infinity | −0.0450 | | |
| G14 | Plane | Infinity | 0.0000 | | Image sensing unit |

TABLE 2B

|  | G3 | G4 | G6 | G7 | G8 | G9 |
|---|---|---|---|---|---|---|
| Radius of Lens | −1.219178 | −48.03823 | 1.9944907 | 4.9268425 | 1.483311 | 6.454404 |
| Conic Constant (K) | 0.528382 | 0 | 5.0787765 | −95.43911 | 0 | 0 |
| Fourth-order Parameter ($A_4$) | 2.03E−02 | −3.64E−02 | −1.16E−01 | −0.017453 | 0.046517 | 0.104608 |
| Sixth-order Parameter ($A_6$) | 1.58E−02 | −7.75E−02 | −7.95E−02 | −1.13E−01 | 8.54E−02 | 0.016484 |
| Eighth-order Parameter ($A_8$) | 0 | 0 | 0 | 0 | 0 | 0 |
| Tenth-order Parameter ($A_{10}$) | 0 | 0 | 0 | 0 | 0 | 0 |

The meaning of the parameters shown in Table 2B may be referred to as that shown in FIG. 1B and described above, and thus no further description in this regard is provided hereinafter. Thereby, the imaging lens 180 may well image the object beam PB on the image sensing module 160.

With reference to FIG. 3B and FIG. 3C, it may be observed from FIG. 3B that the MTF of the virtual image display apparatus 100 is greater than 0.8 when the spatial frequency is 40 cycles per millimeter. That is, the design of the virtual image display apparatus 100 ensures the favorable image contrast and clarity of the object beam PB (e.g., a beam from a real object around the user UR), and the issue of aberration does not affect the object beam PB to a great extent. As shown in FIG. 3C, in the present exemplary embodiment, the imaging distortion of the object beam PB on the x-y plane on the surface G0 is subtle, e.g., less than 2%. The percentage herein refers to the ratio calculated by comparing the object beam PB with a standard grid line.

Figure 4:
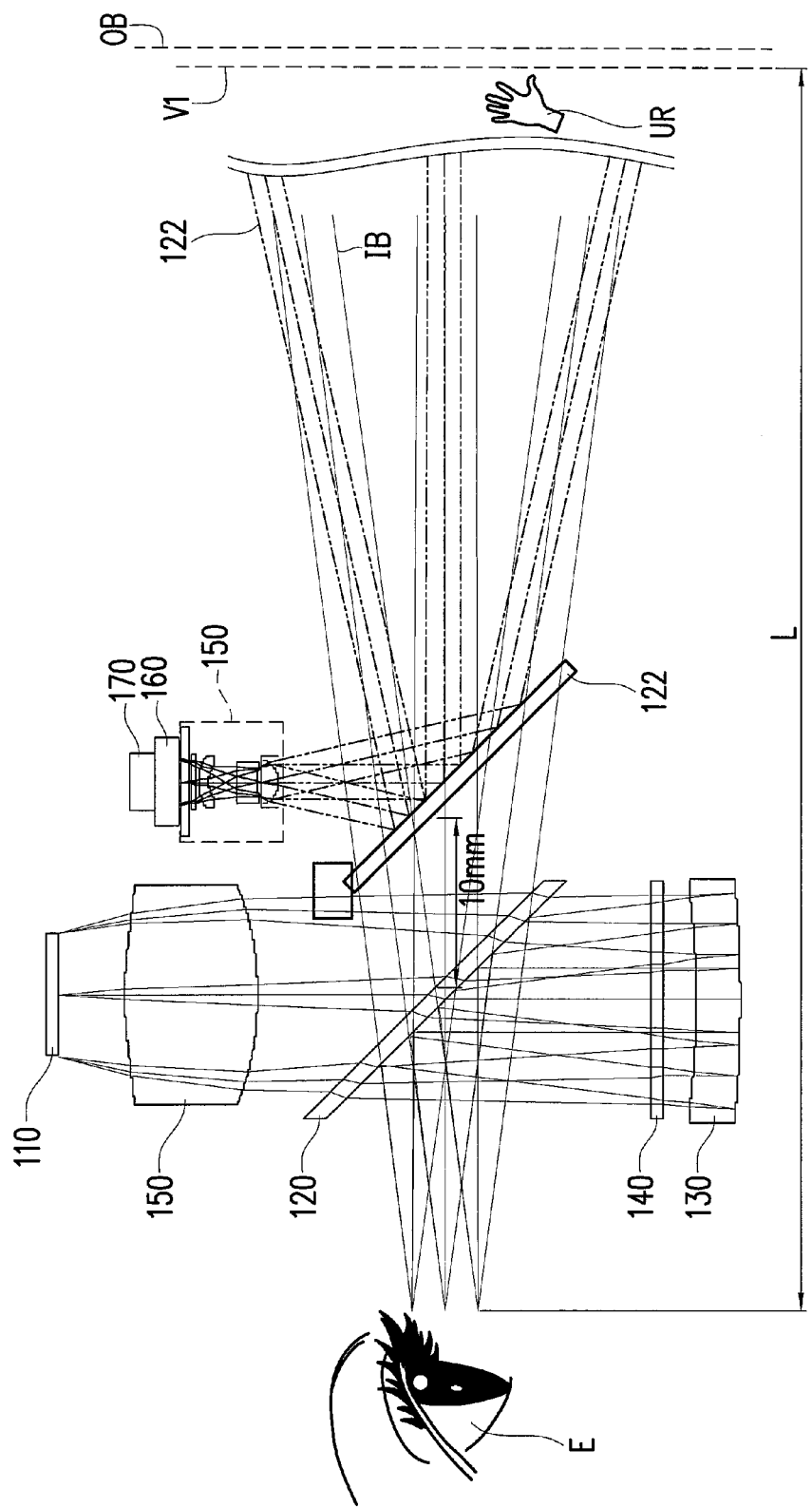
FIG. 4 is a schematic view illustrating the virtual image display apparatuses achieved by combining the structures shown in FIG. 2A and FIG. 3A.

FIG. 4 is a schematic view illustrating the virtual image display apparatuses achieved by combining the structures shown in FIG. 2A and FIG. 3A. With reference to FIG. 4, in the present exemplary embodiment, the design shown in FIG. 2A and FIG. 3A allows the object beam PB and the image beam IB to have the same optical axis, such that an issue of viewing angle disparity does not occur. In addition, the distance L from the object beam PB generated by a foreign ambient object OB to the eye E (e.g., 48 cm in the present exemplary embodiment) may be equal to or greater than the distance from the first virtual image V1 to the eye E. Besides, the distance from the first beam splitting unit 120 to the second beam splitting unit 122 is 10 mm, for instance. However, the disclosure is not limited thereto. Thereby, the user UR is apt to distinguish the real object beam PB from the first virtual image V1, such that the user UR is able to operate, wear, and use the virtual image display apparatus 100.

To ensure that the use of the virtual image display apparatus 100 is accurate and complies with human intuition, a calibration method is provided in an exemplary embodiment of the disclosure. By applying the calibration method, the spatial relationship between the image sensing module 160 and the first virtual image V1 displayed by the image display unit 110 of the virtual image display apparatus 100 and the spatial relationship between the hand of the user UR and said first virtual image V1 may be calibrated. The calibration method will be elaborated hereinafter.

Figure 5A:
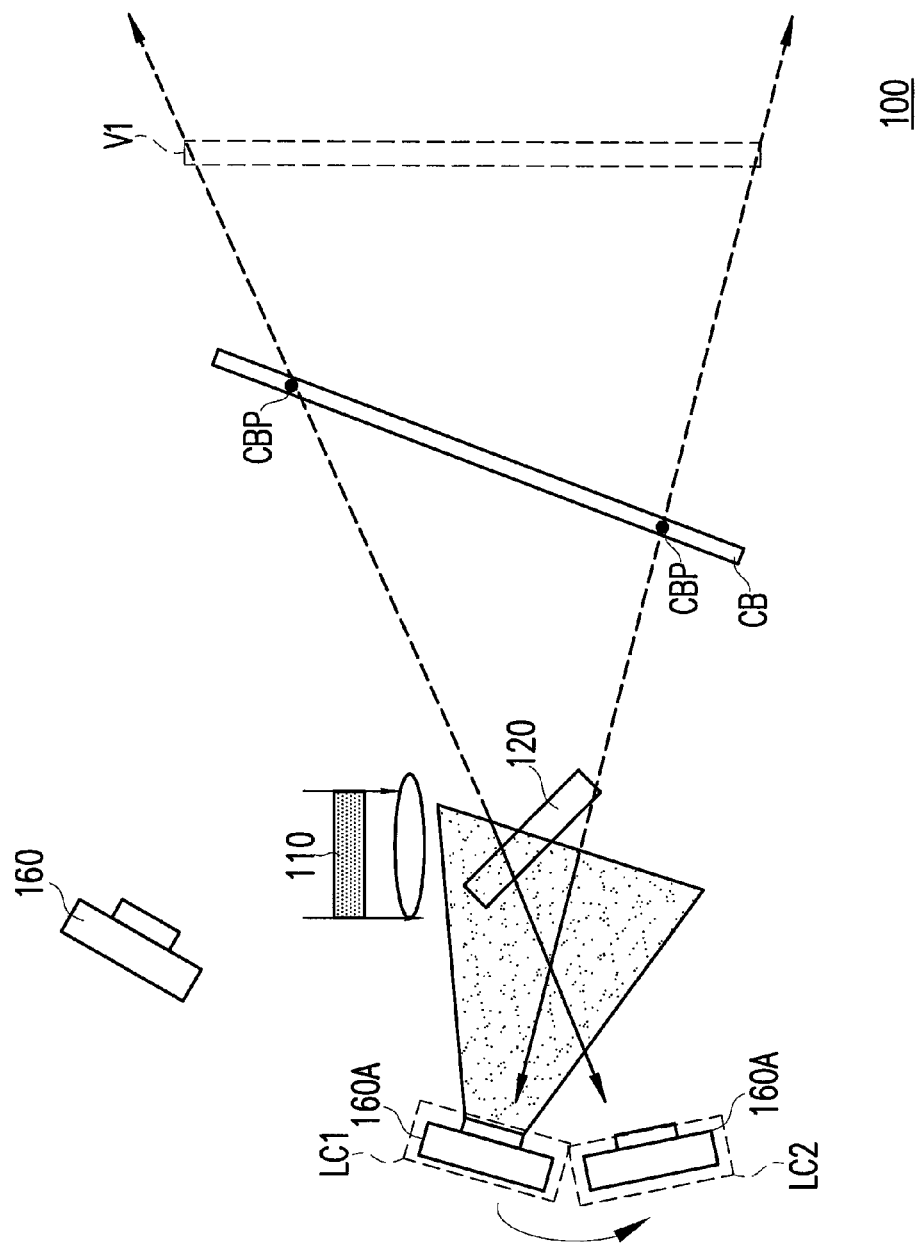
FIG. 5A to FIG. 5C are schematic operational views illustrating a calibration method of a virtual image display apparatus according to another exemplary embodiment.
Figure 5B:
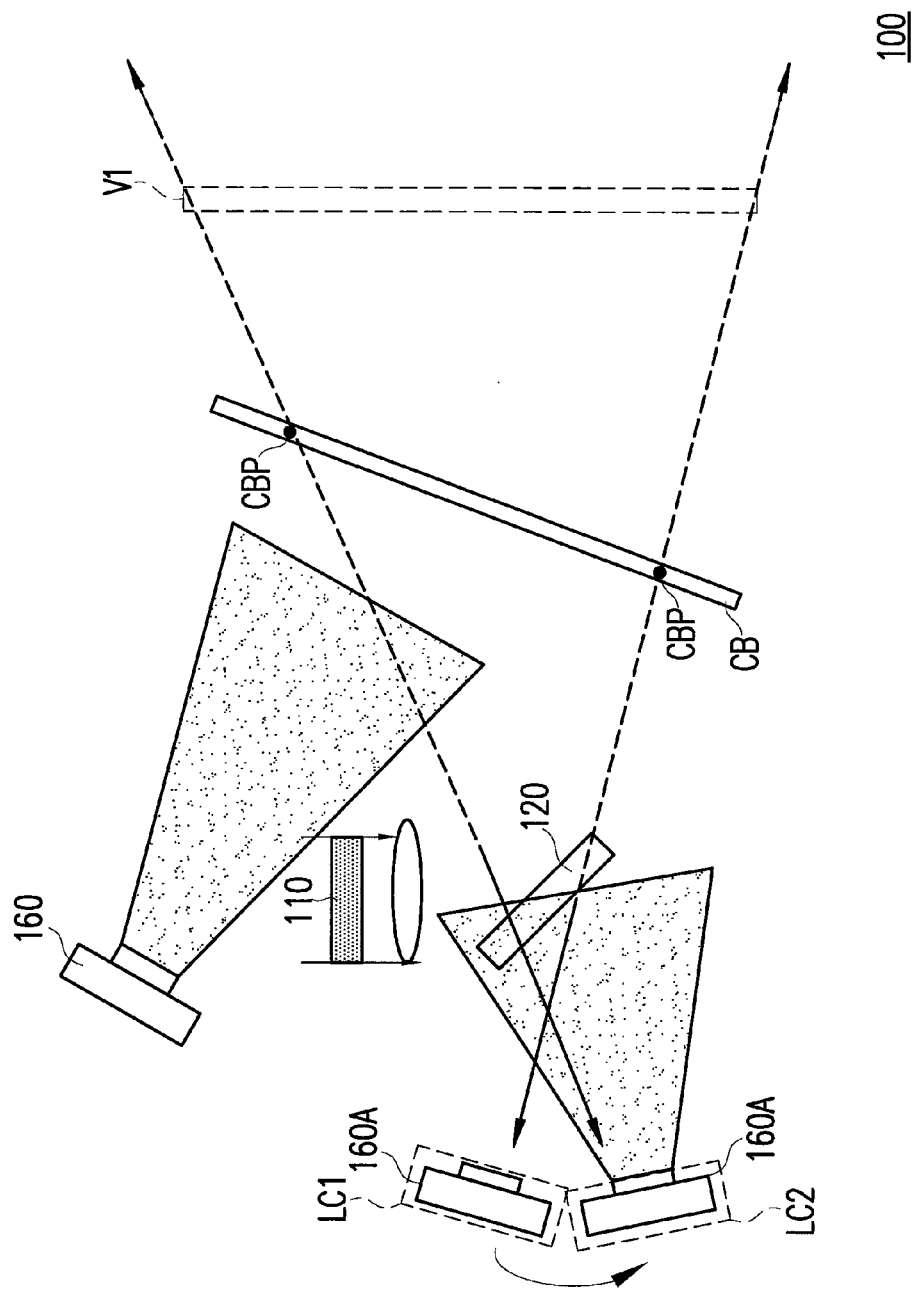
Figure 5C:
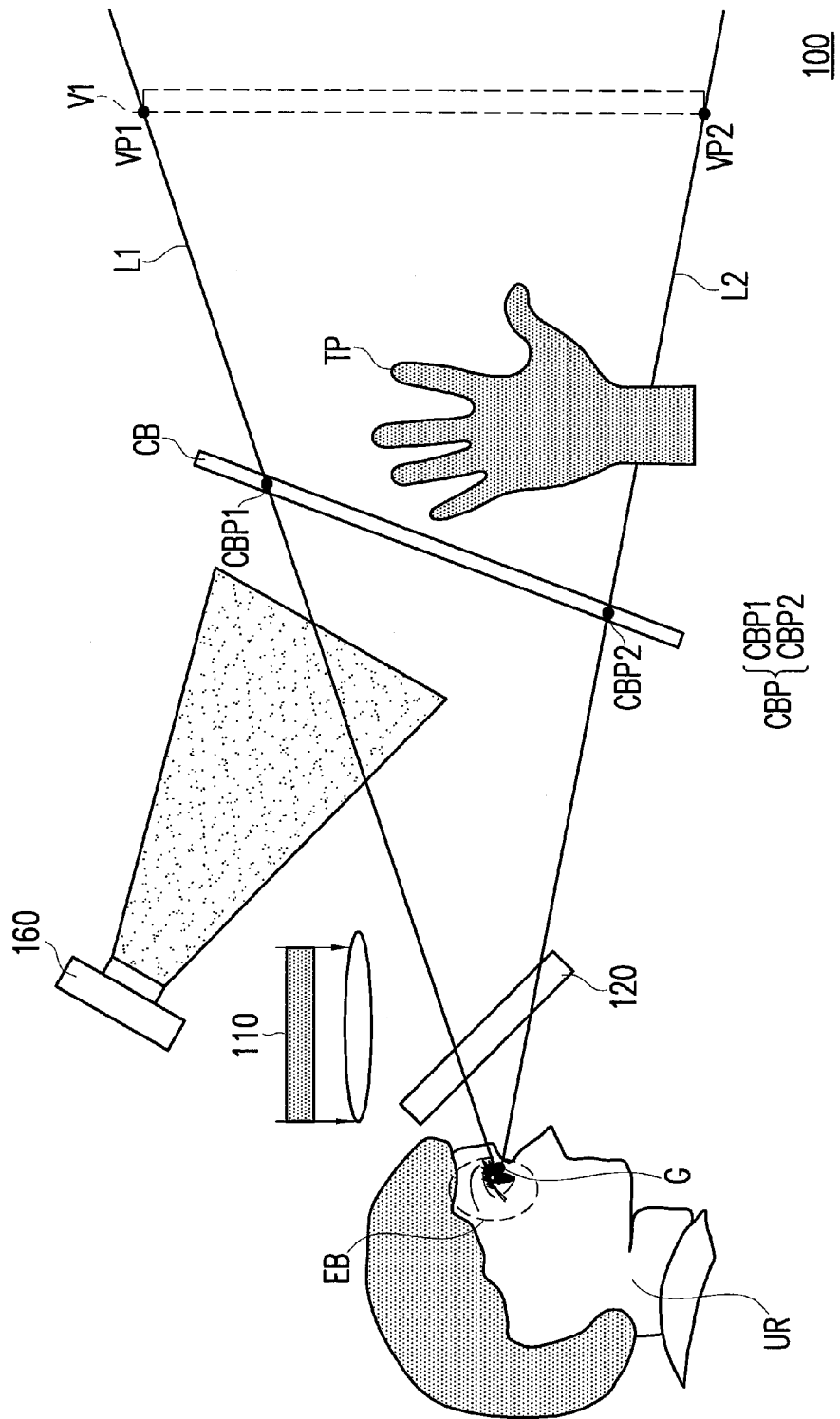

FIG. 5A to FIG. 5C are schematic operational views illustrating a calibration method of a virtual image display apparatus according to another exemplary embodiment. With reference to FIG. 5A to FIG. 5C, in the present exemplary embodiment, the calibration method may be divided into two parts. Specifically, the image sensing module 160 is unable to directly capture the first virtual image V1 displayed by the image display unit 110, i.e., the image sensing module 160 before calibration is unlikely to determine the spatial location of the image actually observed by the eye E of the user UR. Hence, as shown in FIG. 5A, the calibration method in the present exemplary embodiment may comprise sensing a location of the first virtual image V1 by means of an auxiliary image sensing module 160A located around the eye E of the user UR. In particular, the auxiliary image sensing module 160A may be moved to the location LC1 and may capture both the first virtual image V1 and a calibration board CB on an image-capturing light path through the first beam splitting unit 120. At this time, the auxiliary image sensing module 160A is able to capture both the first virtual image V1 and the positioning point CBP on the calibration board CB. The auxiliary image sensing module 160A may then be moved to the location LC2 and may capture both the first virtual image V1 and the calibration board CB on the image-capturing light path through the first beam splitting unit 120. At this time, the auxiliary image sensing module 160A may, from another angle, capture both the first virtual image V1 and the positioning point CBP on the calibration board CB. Since the locations LC1 and LC2 are known, a spatial location relationship matrix M1 of the calibration board CB may be learned by comparing the image of the positioning point CBP captured by the auxiliary image sensing module 160A at the location LC1 with the image of the positioning point CBP captured by the auxiliary image sensing module 160A at the location LC2. Through triangulation, the spatial location of the first virtual image V1 may be further deduced.

With reference to FIG. 5B, the image sensing module 160 may capture images of the calibration board CB and the positioning points CPB, so as to obtain another location relationship matrix M2 of the positioning points CPB. At this time, the relationship between the auxiliary image sensing module 160A and the first virtual image V1 and the relationship between the auxiliary image sensing module 160A and the calibration board CB are known, a location relationship transfer matrix M between the image sensing module 160 and the first virtual image V1 may be deduced by comparing the image of the location of the positioning points CBP captured by the image sensing module 160 with the image of the location of the positioning points captured by the auxiliary image sensing module 160A. For instance, the location relationship transfer matrix M may be deduced from $M1*M2^{-1}$. That is, said calibration method may be applied to learn the relationship between the image sensing module 160 and the first virtual image V1, the relationship between the auxiliary image sensing module 160A and the first virtual image V1, and the relationship between the image sensing module 160 and the auxiliary image sensing module 160A. Although the image sensing module 160 is unable to directly capture the first virtual image V1, the image sensing module 160 may, by means of the auxiliary image sensing module 160A, still obtain the location relationship transfer matrix M indicating the location of the first virtual image V1, and the image sensing module 160 calibrates the first virtual image V1 according to the location relationship transfer matrix M as a calibration predetermined value. After the image sensing module 160 calibrates the first virtual image V1, the auxiliary image sensing module 160A may be removed, and the first part of the calibration method is completely performed.

With reference to FIG. 5C, the virtual image display apparatus 100 is corrected by applying the first part of correction method. A small error of the location may exist as long as the user UR wears the virtual image display apparatus 100. The error may not be significant but may still pose an impact on optical imaging activities, such that the calibrated virtual image display apparatus 100 may still encounter issues of location inaccuracy, range errors, and so on, which is likely to discomfort the user UR. Hence, before the user UR actually uses the virtual image display apparatus 100, the user UR may wear the virtual image display apparatus 100 and perform the second part of the calibration method, such that the virtual image display apparatus 100 may, in response to the location of the eye EB, change the location of images projected by the image display unit 110. The second part of the calibration method may comprise touching the positioning points CBP on the calibration board CB with use of the finger tip TP of the user UR after the user UR wears the virtual image display apparatus 100. Since the image sensing module 160 has already calibrated the first virtual image V1, and the image sensing module 160 is capable of determining the spatial location of the finger tip TP, the image sensing module 160 may calculate and further utilize the relationship between the finger tip TP and the first virtual image V1. For instance, as shown in FIG. 5C, the virtual image positioning points VP1 and VP2 of the first virtual image V1 corresponding to the positioning points CBP1 and CBP2 are known to the image sensing module 160. Thus, after the finger tip TP touches the positioning points CBP1 and CBP2, the location of the eye EB of the user UR wearing the virtual image display apparatus 100 may be determined by the junction G between an extended line L1 connecting the virtual image positioning point VP1 and the positioning point CBP1 and an extended line L2 connecting the virtual image positioning point VP2 and the positioning point CBP2. Note that the two positioning points CBP1 and CBP2 are merely exemplified herein to explain the present exemplary embodiment; in other exemplary embodiments, the spatial location of the eye EB may be further determined by more positioning points. According to the present exemplary embodiment, the spatial location of the first virtual image V1 refers to the position of the first virtual image V1 observed by the eye EB of the user UR. There may not be any object actually existing in the space where the first virtual image V1 is located.

Accordingly, after the location relationship among the image sensing module 160, the hand of the user UR, and the first virtual image V1 is determined, the interaction between the virtual image display apparatus 100 and the user UR may be further enhanced, such that the use of the virtual image display apparatus 100 is more realistic and intuitive. For instance, in the present exemplary embodiment, if a virtual image of buttons (i.e., the first virtual image V1) is displayed by the image display unit 110, and the finger tip TP of the user UR is moved to the buttons but does not press the buttons, the image sensing module 160 may determine that the depth of the spatial location of the finger tip TP is different from the depth of the spatial location of the first virtual image V1 with respect to the eye EB. Hence, the image sensing module 160 may feed the image display unit 110 the profile and shape of the finger tip TP of the user UR. Thereby, the image display unit 110 removes the portion of the first virtual image V1 corresponding to the finger tip TP of the user UR from the first virtual image V1, and the user UR then senses that the finger tip TP is located above the first virtual image V1. This not only gives the sense of reality and enhances the intuitional use of the virtual image display apparatus 100 but also prevents the user UR from being visually confused (e.g., by ghost or superimposing image phenomenon). When the finger tip TP of the user UR presses the buttons in the first virtual image V1, the image sensing module 160 may determine that the spatial location of the finger tip TP is close to the spatial location of the first virtual image V1. Hence, the image sensing module 160 may feed the virtual image display apparatus 100 said information. Thereby, some changes may be made to the first virtual image V1 (e.g., the pressing action on the buttons is displayed, the function corresponding to the button may be executed, or a page-flipping action is performed). This achieves the interaction between the virtual image display apparatus 100 and the user UR, and the user UR may use the image display apparatus 100 in a comfortable and intuitive manner.

To sum up, in an exemplary embodiment of the disclosure, the lens portion and the reflecting portion of the reflection-refraction unit refract and reflect the image beam emitted by the image display unit, such that the favorable imaging quality is ensured even through the volume and the weight of the virtual image display apparatus are effectively reduced. The compensation lens is further applied to correct the image aberration in the optical system of the virtual image display apparatus, and thus the virtual image display apparatus characterized by compactness and light weight may still be able to provide a user with clear display images. Moreover, the image sensing module senses the movement of a user's hand or a handheld object and controls the first virtual image displayed by the image display unit to change in response to the movement of the user through the control unit, such that the virtual image display apparatus may interact with the user. In addition, the FOV of the first virtual image observed by the eye of the user wearing the virtual image display apparatus is less than the FOV of the object beam generated by the ambient object around the user. Accordingly, during the interaction between the user and the first virtual image, the user is able to distinguish the actual image from the displayed image and perceive the distance to the surroundings, so as to ensure that the user UR may use the image display apparatus in a safe and convenient manner.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:
1. A virtual image display apparatus configured to be disposed in front of at least one eye of a user, the virtual image display apparatus comprising:
    an image display unit providing an image beam;
    a first beam splitting unit disposed on a transmission path of the image beam and a transmission path of an object beam from a foreign object, the first beam splitting unit causing at least one portion of the object beam to propagate to the at least one eye; and a reflection-refraction unit, the first beam splitting unit causing at least one portion of the image beam to propagate to the reflection-refraction unit, the reflection-refraction unit comprising:
  a lens portion comprising a first curved surface; and
  a reflecting portion located on the first curved surface of the lens portion, wherein at least one portion of the image beam from the first beam splitting unit travels through the lens portion, is reflected by the reflecting portion, travels through the lens portion again, and is propagated to the at least one eye by the first beam splitting unit in sequence
wherein the virtual image display apparatus satisfies d−ΣA<f, d is a distance from the image display unit to the reflection-refraction unit, f is a focal length of the reflection-refraction unit, A is a ratio obtained by dividing a difference between an optical path length and an actual length at any position on a light path along an optical axis from the image display unit to the reflection-refraction unit by a refraction index at the position, ΣA is a total value of the ratios A at all the positions on the light path along the optical axis from the image display unit to the reflection-refraction unit, and the ratios A at all the positions are at least partially different from one another.

2. The virtual image display apparatus as recited in claim 1, wherein at least one portion of the image beam provided by the image display unit passes through the first beam splitting unit and is propagated to the reflection-refraction unit, at least one portion of the image beam reflected by the reflection-refraction unit is reflected to the at least one eye by the first beam splitting unit, and at least one portion of the object beam passes through the first beam splitting unit and is propagated to the at least one eye.

3. The virtual image display apparatus as recited in claim 1, further comprising a wave plate located on the transmission path of at least one portion of the image beam and between the first beam splitting unit and the reflection-refraction unit, wherein the first beam splitting unit is a polarizing beam splitter.

4. The virtual image display apparatus as recited in claim 1, wherein the first beam splitting unit is a partially-transmissive-partially-reflective beam splitting device.

5. The virtual image display apparatus as recited in claim 1, further comprising a compensation lens located on the transmission path of the image beam and between the image display unit and the first beam splitting unit.

6. The virtual image display apparatus as recited in claim 5, wherein both a refractive power of the compensation lens and a refractive power of the reflection-refraction unit are positive.

7. The virtual image display apparatus as recited in claim 6, wherein a focal length of the compensation lens is shorter than the focal length of the reflection-refraction unit.

8. The virtual image display apparatus as recited in claim 1, further satisfying: 1.2275*(d−ΣA)<f.

9. The virtual image display apparatus as recited in claim 5, wherein an Abbe number of the reflection-refraction unit is smaller than 40, and an Abbe number of the compensation lens is greater than 40.

10. The virtual image display apparatus as recited in claim 1, wherein the lens portion of the reflection-refraction unit is a lens, and the reflecting portion of the reflection-refraction unit is a reflecting coating on a surface of the lens away from the image display unit.

11. The virtual image display apparatus as recited in claim 10, wherein the lens portion of the reflection-refraction unit is a positive meniscus lens and further has a second curved surface opposite to the first curved surface, the first curved surface is a convex surface facing away from the first beam splitting unit, and the second curved surface is a concave surface facing the first beam splitting unit.

12. The virtual image display apparatus as recited in claim 5, wherein the compensation lens is a biconvex lens.

13. The virtual image display apparatus as recited in claim 1, wherein a field of view of the virtual image display apparatus is greater than 29 degrees.

14. The virtual image display apparatus as recited in claim 1, wherein the virtual image display apparatus provides the at least one eye with a two-dimensional image or a three-dimensional image.

15. The virtual image display as recited in claim 1, wherein the at least one eye observes a first virtual image corresponding to the image display unit through the first beam splitting unit, and the first beam splitting unit is located between the first virtual image and the at least one eye.

16. The virtual image display apparatus as recited in claim 15, wherein the first virtual image is located 20 cm to 100 cm in front of the at least one eye.

17. The virtual image display apparatus as recited in claim 15, wherein a size of the virtual image display apparatus is greater than 10 inches.

18. The virtual image display apparatus as recited in claim 15, further comprising an image sensing module and a control unit, wherein the image sensing module detects a relationship between a location of the first virtual image and a location of a finger or a handheld object, and the control unit controls the first virtual image displayed by the image display unit according to the relationship, so as to interact with the user.

19. The virtual image display apparatus as recited in claim 18, further comprising a second beam splitting unit, the first beam splitting unit being located between the at least one eye and the second beam splitting unit, wherein after the object beam and the image beam pass through the first beam splitting unit, the transmission path of the object beam coincides with the transmission path of the image beam.

20. The virtual image display apparatus as recited in claim 19, wherein the second beam splitting unit reflects one portion of the object beam to the image sensing module, and the second beam splitting unit allows another portion of the object beam to pass through and to propagate towards the first beam splitting unit so as to propagate to the at least one eye.

21. The virtual image display apparatus as recited in claim 19, wherein the first beam splitting unit is substantially parallel to the second beam splitting unit.

22. The virtual image display apparatus as recited in claim 19, wherein the second beam splitting unit is a polarizing beam splitter.

23. The virtual image display apparatus as recited in claim 19, wherein the second beam splitting unit is a partially-transmissive-partially-reflective beam splitting device.

24. The virtual image display apparatus as recited in claim 19, wherein a field of view of the object beam observed by the at, least one eye is greater than a field of view of the image beam.

25. The virtual image display apparatus as recited in claim 19, wherein a distance of the object beam traveling from the foreign object to the at least one eye is greater than or substantially equal to a distance from the first virtual image observed by the at least one eye to the at least one eye.

26. The virtual image display apparatus as recited in claim 19, wherein the image sensing module is located beside the image display unit, one portion of the object beam is reflected by the second beam splitting unit and is propagated toward the image sensing module, another portion of the object beam passes through the first beam splitting unit and is propagated to the at least one eye, and the transmission path of the object beam and the transmission path of the image beam are the same and share a same optical axis.

* * * * *